United States Patent [19]

Anderson

[11] Patent Number: 5,538,573
[45] Date of Patent: Jul. 23, 1996

[54] AUTOMATIC VALVE INSERTION METHOD AND APPARATUS THEREFOR

[75] Inventor: Brent G. Anderson, Lake in the Hills, Ill.

[73] Assignee: CTI Industries Corporation, Barrington, Ill.

[21] Appl. No.: 348,588

[22] Filed: Dec. 2, 1994

[51] Int. Cl.$^6$ .......................... B32B 03/22; B32B 07/10; B32B 31/10; B29C 65/02
[52] U.S. Cl. .......................... 156/152; 156/285; 156/290; 156/293; 156/302; 156/308.4; 156/382; 156/552
[58] Field of Search .................................... 156/152, 251, 156/254, 290, 292, 293, 298, 301, 302, 247, 285, 308.4, 552, 382, 306.6, 313

[56] References Cited

U.S. PATENT DOCUMENTS

| | | | |
|---|---|---|---|
| 2,713,746 | 7/1955 | Haugh | 446/224 |
| 3,230,663 | 1/1966 | Shabram | 446/224 |
| 3,810,811 | 5/1974 | Bosse | 156/552 X |
| 4,708,167 | 11/1987 | Koyanagi | 137/512.15 |
| 4,917,646 | 4/1990 | Kieves | 446/224 |
| 4,983,138 | 1/1991 | McGrath et al. | 446/224 |
| 5,248,275 | 9/1993 | McGrath et al. | 446/224 |
| 5,405,479 | 4/1995 | Anderson | 156/308.4 |

FOREIGN PATENT DOCUMENTS 1232028  5/1971  United Kingdom .

OTHER PUBLICATIONS

Public sales of balloons made in accordance with Reference AH occurred in May of 1993.
Applicant acknowledges that it has been known to insert valves between balloon panels or webs by hand, earliest date unknown.

*Primary Examiner*—Michael W. Ball
*Assistant Examiner*—Francis J. Lorin
*Attorney, Agent, or Firm*—Tilton, Fallon, Lungmus & Chestnut

[57] ABSTRACT

An improved method and apparatus for inserting valves between the front and back panels of inflatable bodies, such as air or helium inflated novelty balloons or air-inflated dunnage bags, is disclosed. The method includes the steps of conveying an upper web and lower web through a conveyor assembly in a contiguous relation and conveying the webs to a spreader bar which projects between the peripheral edges of the webs to form an open zone between the peripheral edges of the webs. A valve insertion mechanism separates the webs at the open zone and inserts the valve between the top and bottom webs at the open zone. As the valve insertion mechanism is withdrawn from between the webs, the webs are brought back into a contiguous relation which frictionally retains the valve between the webs. The webs are then further conveyed, with the valve now frictionally retained in position therebetween, to a downstream die station without any attachment of the valve to either of the webs prior to reaching the die station. At the die station, the perimeter of an inflatable body shape is heat sealed into the webs which simultaneously heat seals the valve to both webs. In an alternate embodiment, the spreader bar can be positioned adjacent to the die station so that the valve may be inserted between the webs at the die station where it will then be heat sealed to both of said webs at that station.

23 Claims, 2 Drawing Sheets

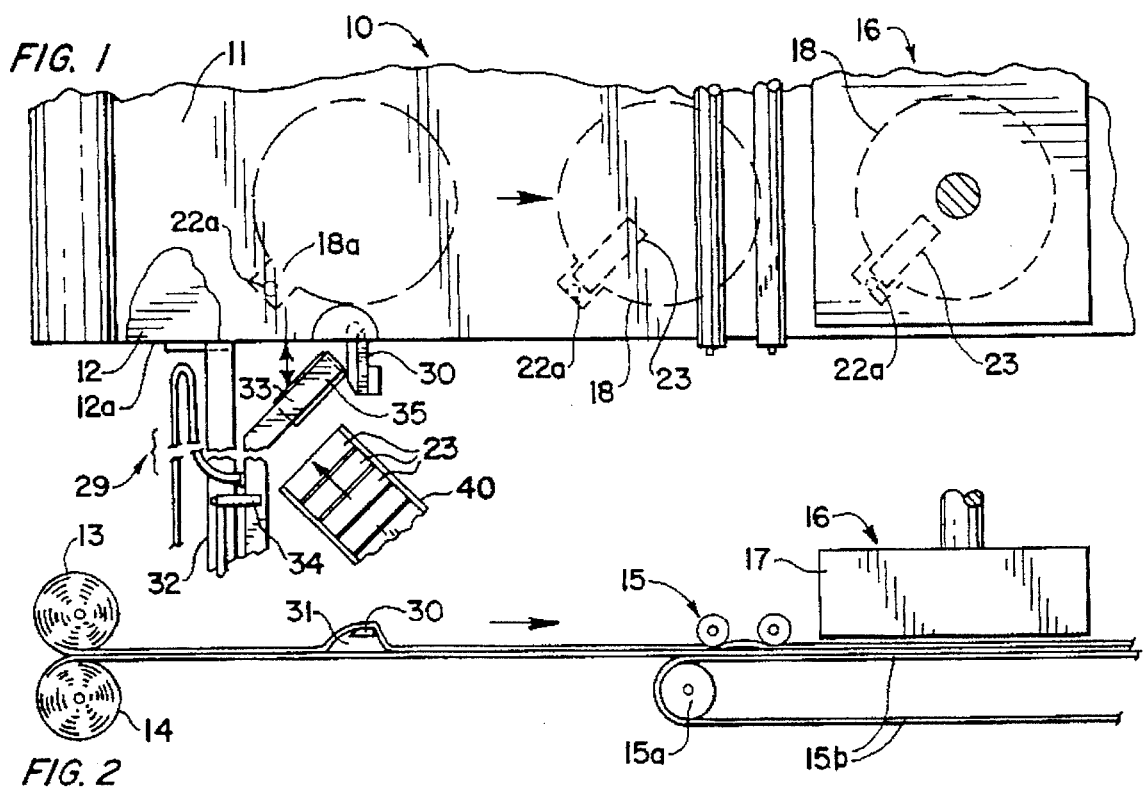
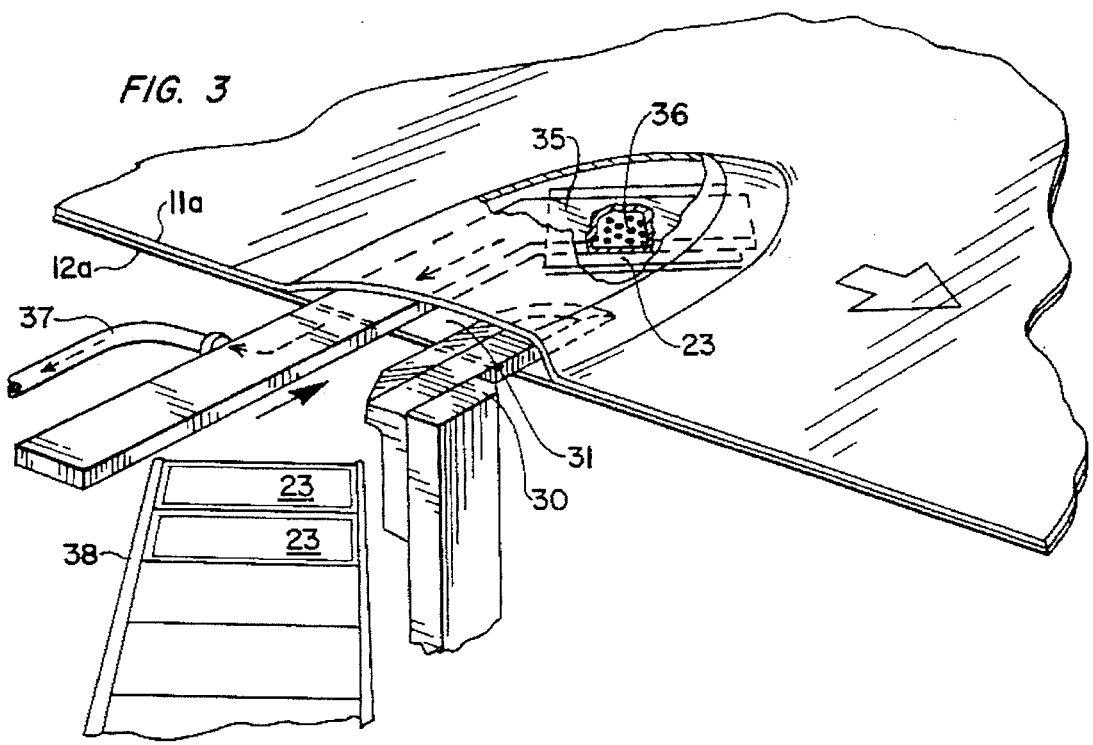

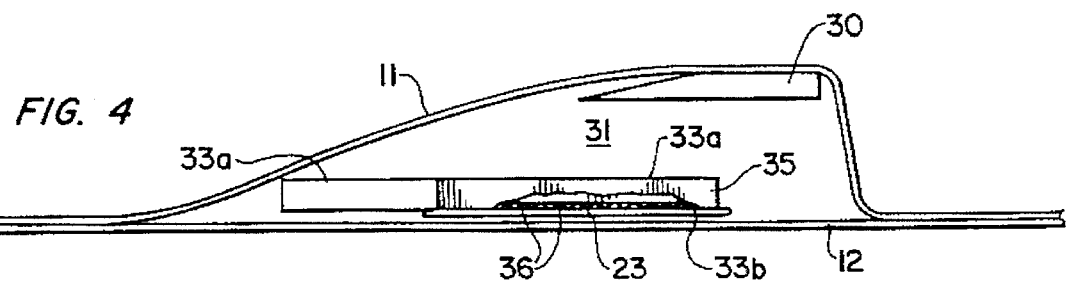
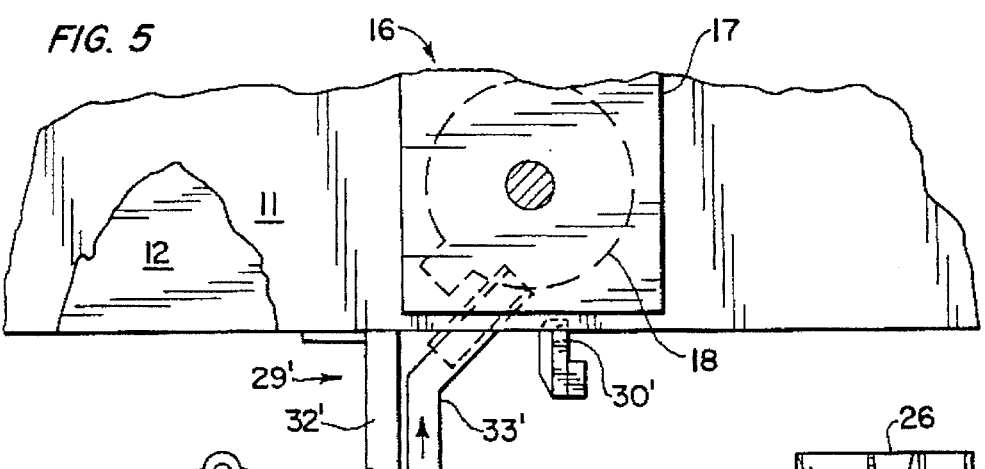
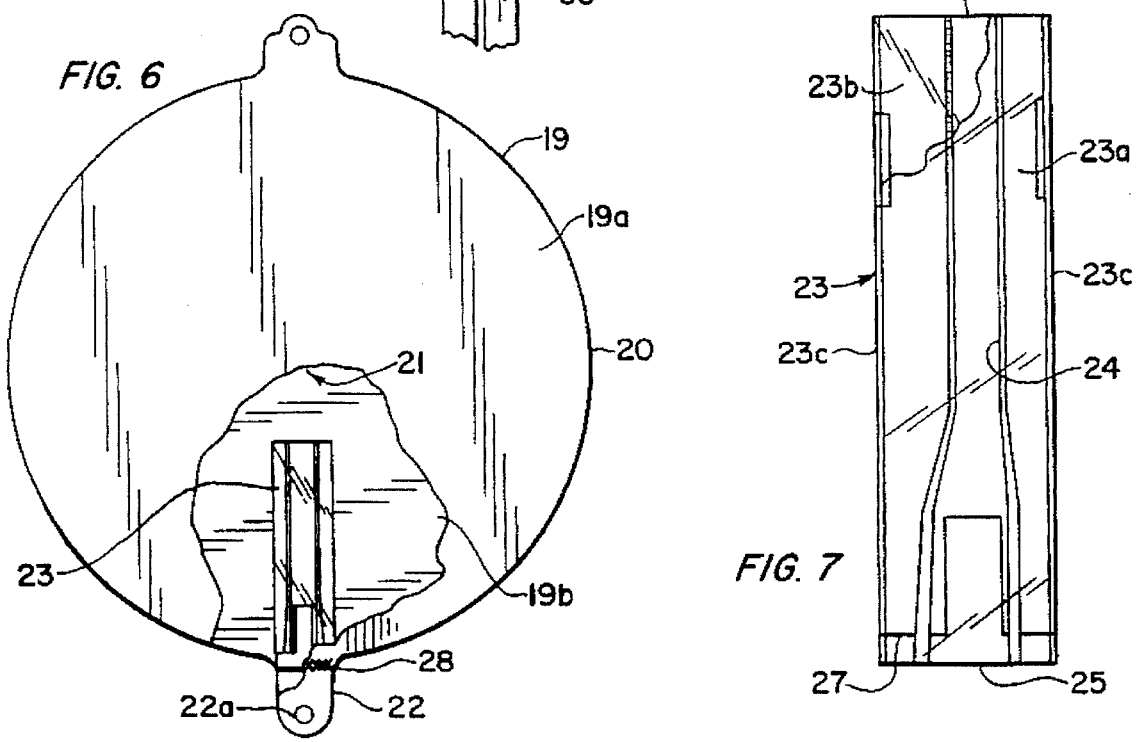

AUTOMATIC VALVE INSERTION METHOD AND APPARATUS THEREFOR

BACKGROUND AND SUMMARY

The present invention relates to an apparatus and a method for inserting flat, flexible, self-sealing valves between front and back panels of inflatable bodies such as novelty balloons or dunnage bags. More particularly, this invention relates to a method and apparatus for inserting such a valve between a front and back panel of an inflatable body without requiring that the valve be initially tacked or otherwise permanently attached to one of the panels prior to conveying the panels to a die station which forms the completed inflatable body.

Currently, there are many types of inflatable bodies that are mass produced and easier methods for producing inflatable bodies are useful in reducing the costs associated with mass production. One example is novelty balloons of the metalized mylar or nylon type that typically have a front panel and back panel sealed together about their periphery to form an inflatable body, typically inflated with a lighter-than-air gas or air. Such balloons often have novelty messages such as "Happy Birthday", "Happy Anniversary", "I Love You" and the like printed thereon and have become quite popular. Another example are inflatable dunnage bags that are a substitute for discrete packing materials and used for bearing against delicate or fragile articles in closed containers during shipment. Such inflatable dunnage bags, typically air-filled, are greatly advantageous over prior packing systems such as filling boxes with so-called styrofoam "popcorn" materials which are harmful to the environment.

With novelty balloon and dunnage bag products, it is known to use an elongated, self-sealing valve comprised of top and bottom layers of flexible plastic film sealed together along their edges to create a valve inlet, a valve outlet, and a passage therethrough. However, merely placing a self-sealing valve between the front and back panels of an inflatable body during the film conversion process has proven to be less than successful for manufacturing such products. This is because, if the valve is simply laid upon one of the webs, vibrations in the machinery, wind or air currents, gravity, and a variety of other factors can cause the valve to move out of position relative to the web, thereby resulting in the valve being sealed between the body's panels in a misaligned fashion. Such products, when formed with misaligned or otherwise improper valve, are non-usable and create wastage.

One method known in the art to prevent the above problems is to initially tack seal or otherwise permanently attach the valve to one of the panels or webs during the conversion process at a time prior to sealing the panels together to form the inflatable body. U.S. Pat. No. 4,917,646, issues to Kieves, is illustrative of such an initial tack sealing method. That patent discloses a valve that has a positioning tab which can be tacked with a heat seal during the manufacturing process directly to one of the two film webs. Although tacking the valve to one of the panels prevents valve misalignment, the method is less than successful from a manufacturing viewpoint as it requires the complexity and expense of providing an extra heat seal and extra die station.

An important aspect of this invention therefore lies in providing a method and apparatus for manufacturing an inflatable body with a self-sealing flexible valve which does not require that the valve be initially tack-sealed or otherwise permanently pre-attached to one of the panels prior to conveying the film webs to a die station and forming the inflatable body from the panels. Briefly, the method of this invention comprises the steps of forming the self-sealing flexible valve, conveying the upper and lower webs of sheet material through a conveyor assembly initially in a contiguous relation, and then conveying the webs of sheet material to a spreader bar which projects between the peripheral edges of the web to form a peripheral open zone between the webs. The webs are then separated at the open zone, and the valve is inserted between the top and bottom webs. Thereafter, the webs are conveyed past the spreader bar and brought back into a contiguous relation so that the webs frictionally retain the valve therebetween in the proper position where the valve was placed. The webs and frictionally clamped valve are then conveyed to a die station without any permanent pre-attachment of the valve to either of the webs. At the die station, the perimeter of an inflatable body shape is heat sealed onto the webs and valve such that the valve is simultaneously heat sealed to both the webs.

In one embodiment of the method of this invention, where automation is desired, the method can additionally involve providing a linear slide positioned generally transverse to the webs and having a vacuum table slidably mounted thereon and moveable between valve loading and valve insertion positions. Pneumatic vacuum ports are provided on the vacuum table to retain the valve thereon, and the table is advanced along the slide assembly in timed fashion to spread the webs and insert the valve between the top and bottom webs at the open zone adjacent to the spreader bar. Thereafter, the vacuum table is retracted so that the webs are brought back into a contiguous relation about the valve and the webs frictionally retain the valve therebetween in the correct position. The webs and valve are then conveyed to a die station where the peripheral shape of an inflatable body is formed. To yet further automate the process, a valve feeding mechanism can then be located adjacent the linear slide and vacuum table for automatically supplying the preformed valves and placing them on the vacuum table when the latter is positioned at the valve loading position.

In another embodiment of this invention, the method comprises separating the webs and inserting the valve between the webs directly at the die station so that the valve is inserted directly at the position where it will be permanently attached to the webs when the inflatable body shape is formed. The method includes the steps of conveying the webs in a contiguous relation to the die station, providing a spreader bar at or otherwise adjacent the die station to create an open zone at the die station, and then spreading the webs and inserting the valve between the webs at the open zone and depositing the valve at the desired valve location. The vacuum table or other means for inserting the valve between the webs is then withdrawn from between the webs and a die stamp or other means is used to form a peripheral heat seal of the inflatable body shape which also simultaneously seals the webs to the valve.

The apparatus of this invention comprises a conveying means for conveying the top and bottom webs from source rolls to a die station in a substantially contiguous relation except for at a valve insertion station. Splitting, i.e. spreader bar, means are provided at the valve insertion station means for spreading peripheral edges of the webs apart to form an open zone. Valve insertion means are provided for spreading the webs and inserting a valve between the top and bottom webs at the open zone. Preferably, the valve insertion means take the form of a linear slide positioned generally transverse to the webs and having a vacuum table slidably mounted thereon. The vacuum table is provided with vacuum ports for retaining a valve thereon. In operation, the valve is placed under the vacuum table, manually or by machine, and the vacuum table is advanced through the open zone to a valve insertion position between the upper and lower webs. A die station is provided for heat sealing the perimeter of an inflatable body shape on the webs and simultaneously heat sealing the valve to both of the webs. The valve insertion means may be provided upstream of the die station so that the webs are conveyed together with a valve frictionally retained during the film conversion process to the die station. However, the valve insertion means may alternatively be positioned adjacent to the die station so that the valve is inserted between the webs and deposited at a valve location on the webs directly where it will be sealed to both webs by the die station.

Preferably, the materials of which the valves and webs are comprised are selected based on their high instance of surface adhesion that occurs between the webs and the valve. Examples of such materials include constructing the webs of thin layers of high density polyethylene, linear low density polyethylene, and polypropylene or a combination of these materials.

In the situation where inflatable dunnage bags are being produced, for example, the valve can be inserted between the webs so that at least a portion of the valve, preferably at least 1 inch or more, extends out from between the peripherally sealed film webs making up the bag body. Such valve extension is to permit quick filling of the dunnage bag with air.

Other objects, features, and advantages of the present invention will become apparent from the following specification and drawings.

BRIEF DESCRIPTION OF THE DRAWINGS

FIG. 1 is a schematic top plan view illustrating the method and apparatus of this invention.

FIG. 2 is a schematic side view of the method and apparatus of this invention.

FIG. 3 is a schematic enlarged perspective view illustrating insertion of the valve between the webs.

FIG. 4 is a schematic side view illustrating insertion of the valve between the two webs.

FIG. 5 is a schematic top plan view illustrating an alternative embodiment of the method and apparatus of this invention.

FIG. 6 is a plan view of a completed product of an inflatable body and self-sealing valve.

FIG. 7 is an enlarged view of a self-sealing valve used in the method of the present invention.

DETAILED DESCRIPTION OF THE INVENTION

Referring to the drawings, the numeral 10 generally designates a film conversion assembly line for forming inflatable bodies. The assembly includes conveyor means for conveying an upper and lower web 11 and 12 from a source to a die station which forms an inflatable body from the webs. In the illustrations given in FIGS. 1 and 2, webs 11 and 12 are drawn from source rolls 13 and 14 by draw roller station 15 to a die station generally designated at 16. Draw roller station 15 includes a conventional powered roller 15a and drive belt 15b for conveying the webs. Die station 16 includes inflatable body forming means for forming an inflatable body from the top and bottom webs. The inflatable body forming means may take the form of a die stamp 17 which is adapted to form a peripheral heat seal on the upper and lower webs against belt 15b to form an inflatable body shape which is generally designated on the webs at 18. The die stamp also includes means for severing the body shape from the webs in a well-known manner (not shown). Such conveying means and die stations are conventional. It will also be understood that the film conversion assembly line will typically include other stations, i.e. prestations, which are not shown in the given illustrations, for performing such advance functions as printing graphics onto the webs, cutting an inflation hole in one web, and the like.

One type of inflatable body that may be formed with the method and apparatus of this invention is illustrated in FIGS. 6 and 7. Inflatable body 19 includes front and back panels 19a and 19b which are respectively formed from webs 11 and 12. A peripheral heat seal 20 seals the peripheral edges of the panels together to form an inner inflatable chamber 21. Inflatable body 19 includes a filler neck 22 which includes an aperture 22a for subsequent insertion of an inflation source (not shown). Opening 22a and filler neck 22 are in communication with a self-sealing valve 23 which is more clearly illustrated in FIG. 7. Valve 23 includes top and bottom layers 23a and 23b which are heat sealed together at their peripheral edges 23c to define a passageway 24 extending therethrough between a valve inlet 25 and valve outlet 26. The respective ends of the top and bottom layers of the valve are coterminous, such that any extended positioning tab or filler tab structure is not required. The valve includes a generally T-shaped zone 27 of dye or other means at the inlet end which prevents the layers of the valve over passageway 24 from being heat sealed together when the valve is heat sealed to the balloon at heat seal 28 (FIG. 6). Upon insertion of an inflation source (not shown) into aperture 23a and injecting air, lighter-than-air gas, or other inflation media into filler neck 23, the inflating media forces passageway 24 open so that the medium fills inflatable chamber 21. Once the balloon has been filled and the injection of air or other media has stopped, the internal pressure within the balloon causes the extended length of self-sealing valve 23 to collapse and fold over inside of the balloon, which acts to seal passageway 24.

The webs 11 and 12 may be constructed of thin layers of high density polyethylene, low density polyethylene, linear low density polyethylene, nylon, mylar, polypropylene, polyester or composite laminates made of these or other similar thin, flexible, plastic-like materials. Similarly, the valves 23 may be constructed of thin layers of high density polyethylene, low density polyethylene, linear low density polyethylene, polypropylene, or composite materials made of these or other similar thin, flexible, plastic-like materials. In any event, the selected materials preferably have a high incidence of surface adhesion between the materials selected for the webs and the materials selected for the self-sealing valve. In a preferred embodiment, the webs are formed from nylon film with a polyethylene coating (linear low density polyethylene or low density polyethylene) and the valve is formed from low density polyethylene.

As shown in FIGS. 2 and 3, webs 11 and 12 are conveyed by the conveying means in a substantially contiguous relation except for at a position adjacent to a valve insertion station 29. Valve insertion station 29 includes peripheral web splitting means for spreading the webs and creating a small break in the contiguous relation between the webs at the valve insertion station. In the given illustrations, the splitting means take the form of a spreader bar 30 which projects between peripheral edges 11a and 12a of the webs to form an open zone 31 between the peripheral edges of the webs. Preferably, spreader bar 30 projects between the webs only a short distance of approximately 0.75–1.5 inches, preferably about 1 inch, which is sufficient to form open zone 31. Typically, webs for forming common inflatable bodies have a width of about 19 to 38.5 inches.

Valve insertion means are provided for spreading the webs and inserting a valve between the top and bottom webs at the open zone. The valve insertion means deposits the valve at a desired valve location 18a with respect to the final peripheral shape 18 of the inflatable body. The valve insertion means may take the form of a linear slide 32 positioned generally transverse to the webs and having a vacuum table 33 slidably mounted thereon. Vacuum table 33 may be slidably mounted to the linear slide with a shuttle 34 and is preferably pneumatically operated to slide between the distal and proximal ends of the linear slide from a valve loading position outside of the webs to a valve insertion and locating position between the webs. The vacuum table includes a valve-retaining arm 35 which includes a plurality of vacuum ports 36 which are connected by a hose 37 to a vacuum source (not shown). Vacuum table 33 includes an upper surface 33a and a lower surface 33b and the vacuum ports are preferably located on the lower surface 33b of the vacuum table. As shown in FIGS. 3 and 4, when the vacuum table is advanced between the webs at the open zone, the top surface 33a of the vacuum table engages and lifts upper web 11 apart from lower web 12 to separate the webs adjacent to open zone 31. Since the valve is mounted on the bottom of the vacuum table, the valve remains retained on the vacuum table during the spreading and insertion step and is released onto lower web 12 at a desired location 18a by stopping the vacuum source which is connected to vacuum ports 36. This releases the valve so that it falls onto the lower web at a desired valve location 18a which is aligned with the neck portion 22 of the final inflatable body shape and which is positioned adjacent to filler hole 22a.

When the vacuum table 33 is withdrawn or retracted from between the webs, the webs are brought back into or resume a contiguous relation about the valve to frictionally retain the valve therebetween as it is conveyed down the assembly line. In the given illustrations, the valve-retaining portion 35 of the vacuum table is at an angle to the webs but it will be understood that the vacuum table may have a differently positioned valve-retaining portion depending on the particular inflatable body shape being made. Such other configurations may include situations where the valve retaining portion 35 of the vacuum table is only partially inserted between the webs so that an inlet end of the valve projects outward from the periphery of the webs a predetermined distance; that valve extension configuration may be desirable in applications such as for forming inflatable dunnage bags.

In operation, a self-sealing valve 23 is disposed on the valve-retaining portion 35 of vacuum table 33 and suction pressure at vacuum ports 36 retains the valve thereon. Preferably, valve 23 is retained on the bottom side 33b of the vacuum table 33 so that, upon stopping the vacuum source, the valve 23 will fall off of the valve-retaining portion 35 under the force of gravity at a desired location. As shown in FIGS. 3 and 4, the vacuum table 33 inserts the valve 23 between the webs 11 and 12 by engaging and lifting the upper web 11 at the open zone 31 and advancing to a desired valve location 18a that corresponds to the final balloon shape 18. Once so positioned, the vacuum source for the vacuum table 33 is stopped so the valve 23 drops onto the lower web 12 at the desired location. Thereafter, the pneumatic slide 32 retracts the vacuum table 33 out from underneath the upper web 11, while the now-placed valve stays in its correct position where deposited on lower web 12, so that the webs 11 and 12 resume a contiguous relation after the vacuum table is withdrawn, and the webs frictionally engage the valve therebetween as the webs and retained valve are further conveyed to the die station 16.

The valve insertion station 29 may be additionally provided with a valve feeding mechanism 38 having a plurality of valves 23 disposed thereon for advancement to the vacuum table's loading position where the vacuum table 33 can pick the valves up off of the mechanism with the vacuum ports. In this manner, the system can be completely automated so that the valve feed mechanism feeds a plurality of valves 23 to the vacuum table 33 which then cyclically picks up valves and deposits them between the webs at desired valve locations 18a for a plurality of inflatable body shapes 18 which are formed from the webs 11 and 12.

In an alternate embodiment of the present invention illustrated in FIG. 5, the valve insertion station 29' is positioned directly adjacent to die station 16. In such a construction, the valve insertion means is so positioned that the valve 23 is inserted between the webs 11 and 12 so that it is directly released onto the lower web 12 in its final location where it will be heat sealed to the upper and lower webs 11 and 12. The valve insertion means may take the form of the linear slide and vacuum table assembly as previously discussed. In such a construction, the spreader bar 30' projects between the webs to create an open zone and the vacuum table 33' is advanced into the open zone to lift the upper web 11 and deposit or release the valve 23 onto the desired location where it will be heat sealed to the webs by a peripheral die stamp 17. Once the valve is so deposited, the vacuum table 33 is withdrawn from between the webs 11 and 12 and the die station 16 heat seals the periphery of the inflatable body shape 18 and simultaneously heat seals both webs 11 and 12 to the valve 23.

While the foregoing embodiments of the invention have been disclosed in considerable detail for purposes of illustration, it will be understood by those skilled in the art that many of these details may be varied without departing from the spirit and scope of the invention.

I claim:

1. An improved automatic valve insertion method for inserting a flexible valve between a front and back panel of an inflatable body, said method comprising the steps of:

forming a flexible valve comprised of first and second flexible plastic layers sealed together to form a passage extending therethrough, a valve inlet and a valve outlet;

conveying an upper web and lower web of sheet material through a conveyor assembly with said webs initially being in a substantially contiguous relation except for an open zone at a peripheral edge of said webs, said open zone being formed by a spreader bar which projects between peripheral edges of said upper and lower webs;

providing a linear slide positioned generally transverse to said webs and having a vacuum table slidably mounted thereon, said vacuum table being slidable between a loading position outside of said webs to a valve insertion position between said webs;

placing said valve on said vacuum table at said loading position and retaining said valve thereon with vacuum ports;

advancing said vacuum table along said linear slide to separate said webs at said open zone and to insert said valve at said insertion position between said webs;

releasing said valve from said vacuum table at a valve location so as to deposit said valve between said webs;

retracting said vacuum table from between said webs so that said webs are brought back into said contiguous relation and said webs frictionally retain said deposited valve therebetween; and thereafter, conveying said webs and retained valve to a die station.

2. The invention of claim 1 comprising the further step of heat sealing a perimeter of an inflatable body shape at said die station on said webs such that said valve is simultaneously heat sealed to both of said webs.

3. The invention of claim 1 comprising the further step of simultaneously heat sealing said valve to both of said webs at said die station.

4. The invention of claim 1 in which said spreader bar projects between said webs and beyond their peripheral edges a distance of approximately 0.75–1.5 inches.

5. The invention of claim 1 comprising the further steps of cyclically repeating said steps of placing the valve on the vacuum table, advancing the vacuum table between the webs, and releasing the valve therebetween so that a plurality of said valves are deposited between said webs at a plurality of valve locations corresponding to inflatable body shapes to be formed from said webs.

6. The invention of claim 5 comprising the further step of providing a plurality of said valves on a valve feeding mechanism adjacent to said vacuum table and said step of placing said valve on said vacuum table includes picking said valve off of said valve feeding mechanism at said valve loading position.

7. The invention of claim 1 comprising a further step of supplying a vacuum pressure to said ports in said vacuum table for retaining said valve thereon.

8. The invention of claim 7 including the further step of, once said vacuum table is advanced to said valve insertion position, stopping said supplying of said vacuum pressure to said vacuum ports of said vacuum table so that said valve is released from said vacuum table and deposited between the webs at the desired location.

9. The invention of claim 1 in which said vacuum table includes a top surface and a bottom surface and said vacuum ports are located on said bottom surface, and said step of advancing said vacuum table to said insertion position between said webs includes advancing said vacuum table between the webs so that said upper surface engages and lifts said upper web to separate said webs at said open zone.

10. An improved valve insertion method for inserting a flexible valve between a front and back panel of an inflatable body, said method comprising the steps of:

forming a flexible valve comprised of first and second flexible plastic layers bonded together to form a passage extending therethrough, a valve inlet, and a valve outlet;

conveying an upper and lower web of sheet material through a conveyor assembly with said webs being in a contiguous relation just prior to being positioned adjacent to a die station;

conveying said webs over a spreader bar adjacent to said die station which projects between peripheral edges of said upper and lower webs to form an open zone between said peripheral edges of said webs;

separating said webs and inserting said flexible valve between said top and bottom webs at said open zone; and heat sealing a perimeter of an inflatable body shape onto said webs at said die station so that said inserted valve is simultaneously heat sealed to both of said webs, said step of inserting said valve between said webs including providing a linear slide positioned generally transverse to the webs and having a vacuum table slidably mounted thereon, placing said valve on said vacuum table at a loading position and retaining said valve thereon with vacuum ports, thereafter advancing said table along said linear slide to a valve insertion position between said webs at said open zone, and then depositing said valve from said vacuum table at a valve location between the webs.

11. The invention of claim 10 further comprising the steps of selecting and forming said flexible valve and said webs of materials which are prone to adhere to each other due to their respective surface adhesion properties.

12. The invention of claim 10 in which said spreader bar projects between said webs and beyond their peripheral edges a distance of approximately 0.75–1.5 inches.

13. The invention of claim 10 in which said step of inserting said flexible valve includes advancing said vacuum table such that an upper surface of said vacuum table engages and lifts said upper web apart from said lower web to enlarge said open zone.

14. An improved apparatus for inserting a valve between the front and back panel of an inflatable body, said apparatus comprising:

a valve insertion station;

conveying means for conveying an upper and lower web from a source to a die station in a contiguous relation just prior to and after said valve insertion station;

splitting means for spreading peripheral edges of said upper and lower webs apart to form an open zone between said peripheral edges of said webs at said valve insertion station; and p1 valve insertion means positioned external to said webs at said valve insertion station for separating said webs and inserting a valve between said upper and lower webs at said open zone, said valve insertion means including a linear slide positioned generally transverse to said webs and a vacuum table slidably mounted thereon for movement between a valve loading position and a valve insertion position.

15. The invention of claim 14 in which die station means are provided for simultaneously heat sealing said valve to both of said webs after said valve insertion means inserts said valve between said webs.

16. The invention of claim 15 in which said die station means includes an inflatable body stamp adapted to heat seal a peripheral shape of an inflatable body on said webs and simultaneously heat seal said valve to both of said webs.

17. The invention of claim 15 in which said valve insertion means are positioned upstream from said die station so that said conveying means conveys said webs from said valve insertion means to said die station with said webs in a contiguous relation and said valve frictionally retained between said webs.

18. The invention of claim 15 in which said valve insertion means are positioned adjacent to said die station and said valve insertion means are adapted to place said valve in a position where it is simultaneously heat sealed to said webs.

19. The invention of claim 14 in which said vacuum table includes vacuum ports and vacuum suction means for creating a negative pressure at said vacuum ports for retaining a valve on said vacuum table.

20. The invention of claim 19 in which said vacuum table includes a top surface and a bottom surface and said vacuum ports are positioned on said bottom surface of said vacuum table.

21. The invention of claim 20 in which, when said vacuum table is advanced to said valve insertion position, said upper surface of said vacuum table engages and lifts said upper web to enlarge said open zone.

22. The invention of claim 14 in which said splitting means comprises a spreader bar which projects between peripheral edges of said webs.

23. The invention of claim 22 in which said spreader bar projects beyond said peripheral edges of said webs a distance of approximately 0.75–1.5 inches.

* * * * *

UNITED STATES PATENT AND TRADEMARK OFFICE
CERTIFICATE OF CORRECTION

PATENT NO. : 5,538,573
DATED : July 23, 1996
INVENTOR(S) : Brent G. Anderson

It is certified that error appears in the above-indentified patent and that said Letters Patent is hereby corrected as shown below:

In Claim 14, column 8, line 35, delete "pl".

Signed and Sealed this

Fifth Day of November, 1996

Attest:

BRUCE LEHMAN

*Attesting Officer*      *Commissioner of Patents and Trademarks*